(12) United States Patent
Abe (10) Patent No.: US 8,947,480 B2
(45) Date of Patent: Feb. 3, 2015

(54) APPARATUS SUPPLYING A SIGNAL FOR GENERATING A MULTITONE IMAGE

(75) Inventor: Hiroyuki Abe, Shizuoka (JP)

(73) Assignee: Naltec Inc., Shizuoka (JP)

( * ) Notice: Subject to any disclaimer, the term of this patent is extended or adjusted under 35 U.S.C. 154(b) by 21 days.

(21) Appl. No.: 13/806,899

(22) PCT Filed: Jun. 23, 2011

(86) PCT No.: PCT/JP2011/003590
§ 371 (c)(1),
(2), (4) Date: Mar. 18, 2013

(87) PCT Pub. No.: WO2011/161967
PCT Pub. Date: Dec. 29, 2011

(65) Prior Publication Data
US 2013/0169727 A1 Jul. 4, 2013

(30) Foreign Application Priority Data
Jun. 25, 2010 (JP) ................. 2010-144533

(51) Int. Cl.
*B41J 2/335* (2006.01)
*B41J 2/355* (2006.01)
*G06K 15/02* (2006.01)
*H04N 1/40* (2006.01)

(52) U.S. Cl.
CPC ............ *B41J 2/355* (2013.01); *G06K 15/028* (2013.01); *G06K 15/1894* (2013.01); *H04N 1/40025* (2013.01)

USPC ............................................. 347/211
(58) Field of Classification Search
USPC ............... 347/5, 9, 10, 12, 13, 183, 211; 400/120.07; 358/1.1, 3.01
See application file for complete search history.

(56) References Cited

U.S. PATENT DOCUMENTS 8,305,415 B2 * 11/2012 Ohno .......................... 347/237

FOREIGN PATENT DOCUMENTS

| JP | 08160808 A | 6/1996 |
|----|------------|--------|
| JP | 2001270145 A | 10/2001 |
| JP | 2005141522 A | 6/2005 |
| JP | 2009061747 A | 3/2009 |
| JP | 2011051319 A | 3/2011 |

* cited by examiner

Primary Examiner — Huan Tran
(74) Attorney, Agent, or Firm — Blank Rome LLP (57) ABSTRACT

The printer (1) includes a control unit (20) including a function reproducing multiple tones by outputting energization data that is dot control data in multiple cycles in line units to a head unit (10) including a plurality of dot generating elements disposed in a line. The control unit (20) includes: a thermal head control circuit (60) supplying the energization data of each cycle and a latch signal for the energization data of each cycle to the head unit (10); and a mask circuit (70) operable when the energization data of the current cycle is the same as the energization data of the previous cycle, to erase the current energization data and the signal for latching to be supplied to the head unit (10).

10 Claims, 7 Drawing Sheets

APPARATUS SUPPLYING A SIGNAL FOR GENERATING A MULITTONE IMAGE

The present application is a National Stage of PCT/JP2011/003590, filed Jun. 23, 2011, which claims the benefit of Japanese Patent Application No. 2010-144533, filed Jun. 25, 2010. The disclosures of those applications are hereby incorporated in their entirety by reference as if fully set forth herein.

TECHNICAL FIELD

The present invention relates to an apparatus supplying a signal for generating a multitone image.

BACKGROUND ART

Japanese Laid-Open Patent Publication No. 2009-61747 discloses a driver apparatus where it is possible to arbitrarily select the number of tone bits for tone data and to speed up processing by carrying out data processing in accordance with such number of tone bits. This driver IC (driver apparatus) is equipped with a shift register unit including a reset function, a latch circuit unit to which tone data is transferred from the shift register unit, an SLCK counter that includes a reset function and counts strobe clock signals, and a tone control circuit unit controlling a light emission time of LED elements in accordance with tone values shown by the tone data based on the count number of the SCLK counter.

DISCLOSURE OF THE INVENTION

In addition to said optical print heads, almost head units that output multitone images by controlling the illumination time or heating time of a line thermal head with a plurality of heater elements include a shift register and a latch circuit. Such head units output multitone images by activating latched signals using a strobe signal (strobe clock). In an apparatus (image generating apparatus) equipped with such a head unit, when the number of tones increases, the numbers of times data are transferred to the head unit will also increase. Due to the use of a high-speed (high-frequency) clock and/or an increase in the frequency of data switching, this results in an increase in power consumption.

One aspect of the present invention is a control apparatus that reproduces multiple tones by outputting dot control data in multiple cycles in line units to a head unit including a plurality of dot generating elements disposed in a line. The control apparatus includes: a signal supplying unit supplying the dot control data of each cycle and a signal for latching the dot control data of each cycle to the head unit; and an erase unit operable when the dot control data of the current cycle is the same as the dot control data of the previous cycle, to erase the dot control data of current cycle and/or the signal for latching the dot control data of current cycle to be supplied from the signal supplying unit to the head unit. This control unit may be provided as an LSI, an ASIC, a printed circuit board, a control unit, or a controller, and may also be provided as an apparatus including a head unit or the like.

The signal supplying unit supplies information (multitone information), which generates one line that forms a multitone image, in line units fundamentally as binary dot control data (a dot control data set) split between multiple cycles. When one or more tones are not present in the multitone information of one line, the signal supplying unit will try to repeatedly supply the same dot control data. However, since the erase unit erases the same dot control data, the same dot control data is not supplied to the head unit. This means that it is possible to reduce the number of times data is transferred from the control apparatus to the head unit and possible to reduce the power consumption of the control apparatus and/or the head unit.

The erase unit may include a unit that outputs an erase signal that stops the signal supplying unit generating or supplying the dot control data and/or the signal for latching. The erase unit may include a mask unit that erases the dot control data and/or the signal for latching on a path from the signal supplying unit to the head unit. By erasing both the dot control data and the signal for latching, it is possible to further reduce power consumption.

In addition, the erase unit may include a clock erase unit erasing a head clock signal used to transfer the dot control data. By eliminating the clock signal, it is possible to further reduce power consumption. The clock erase unit may include a clock mask unit masking and erasing the head clock signal on a path from the signal supplying unit to the head unit.

The signal supplying unit may include a first unit generating the dot control data of each cycle and a second unit generating the signal for latching, and the erase unit may include a clock control unit stopping supplying of an operation clock to the first unit and/or the second unit. The supplying of the operation clock to the first unit that generates the dot control data and/or the second unit that generates the signal for latching is turned on and off by the erase signal so that it is possible to erase the dot control data and/or the signal for latching inside the signal supplying unit.

In addition, the erase unit may include a clock control unit stopping supplying of an operation clock to a head clock generating unit generating a head clock used to transfer the dot control data. By turning on and off the operation clock supplied to the head clock generating unit according to the erase signal, it is possible to erase the head clock.

Another aspect of the present invention is an image generating apparatus including the control apparatus described above and a head unit. One example of a plurality of dot generating elements is a plurality of heating elements, and the head unit includes a line thermal head.

Yet another aspect of the present invention is a control method of an image generating apparatus including a control apparatus supplying dot control data to a head unit including a plurality of dot generating elements disposed in a line. This control method includes reproducing multiple tones by outputting the dot control data in multiple cycles in line units from the control apparatus. The reproducing multiple tones also includes: supplying the dot control data of each cycle and a signal for latching the dot control data of each cycle to the head unit; and erasing, when the dot control data of the current cycle is the same as the dot control data of the previous cycle, at least one of the dot control data of the current cycle and the signal for latching the dot control data of the current cycle to be supplied to the head unit. The signals may be eliminated by a mask unit or may be eliminated by stopping a clock.

In addition, when the control apparatus further includes a head clock generating unit generating a head clock used to transfer the dot control data, reproducing the multiple tones should preferably include erasing the head clock signal if the dot control data of the current cycle and the dot control data of the previous cycle are the same.

DETAIL DESCRIPTION

Figure 1:
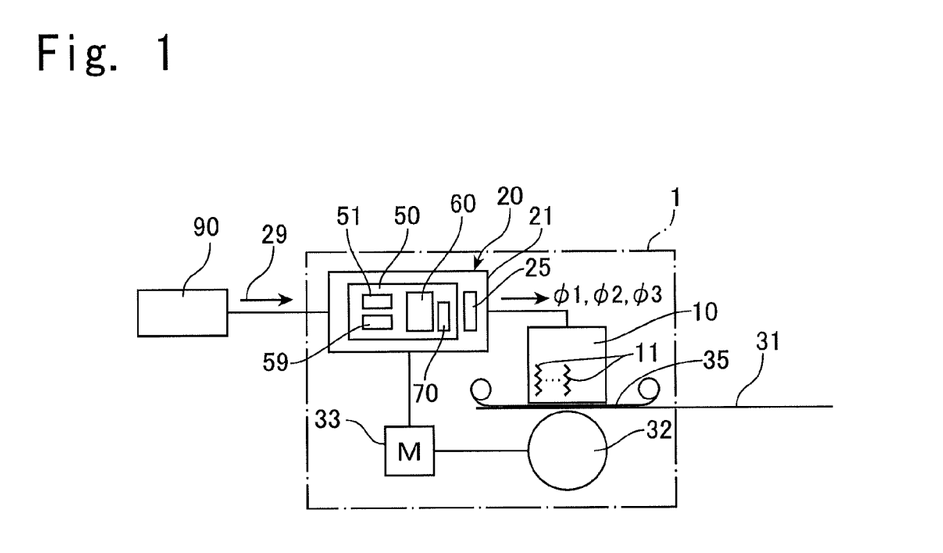
FIG. 1 is a diagram showing an arrangement of one example of a printer.

FIG. 1 shows the arrangement of one example of an image generating apparatus (a printer) according to the present invention. This image generating apparatus (printer) 1 is a sublimation-type thermal printer. The printer 1 includes a line-type thermal head (thermal print head) 10 with n heating elements (or "heaters" or "dot generating elements") 11 for generating dots disposed in a line, a platen roller 32 for conveying a recording medium (paper) 31, a multi-sublimation ribbon 35 for printing in multiple colors onto the paper 31, a motor 33 that drives the platen roller 32, and a control unit (control apparatus) 20 controlling such components.

The control unit 20 acquires, from a host apparatus 90 such as a personal computer, data (print data) 29 for printing an image including a variety of content such as images, characters, and the like, and prints based on the print data 29 on the recording medium (paper) 31 using the thermal head 10. With this sublimation (thermal transfer, sublimation transfer) type printer (image generating apparatus) 1, the ink ribbon (sublimation ribbon) 35 is heated as a medium by thermal energy from the heating elements 11 and forms (generates) dots on the recording medium 31 with the ink discharged from the ribbon 35. Another example of a medium that can generate an image using the thermal head 10 is thermal paper. If the medium is thermal paper, dots are formed (generated) in order to form an image on the surface of the thermal paper by thermal energy supplied from the heating elements 11 that are arranged in a line. That is, in this case, the thermal paper serves as both the medium and the recording medium.

Typical control unit 20 includes a printed circuit board 21 on which an LSI 50 or the like is mounted. The LSI 50 includes a print data buffer 59 that stores the print data 29 acquired from the host apparatus 90, a thermal head control circuit 60 that converts the print data 29 stored in the print data buffer 59 to data for each line and supplies such data to the thermal head 10, a mask unit (mask circuit) 70 that masks the data and signals outputted from the thermal head control circuit 60, and a CPU 51 that controls such components. The printed circuit board 21 also includes a voltage level converting IC 25 that converts a voltage level of various data and signals outputted from the LSI 50 to a voltage that drives the thermal head 10. The voltage level converting IC 25 also includes a function as a buffer IC.

The thermal head control circuit 60 generates dot control data (energization data) $\phi 1$ including (m−1) binary signals for reproducing multiple tones (m tones) for the n heating elements (dot generating elements) 11 that compose one line and serially transfers the data (m−1) times in line units to the thermal head 10 to reproduce the multiple tones. In addition, the thermal head control circuit 60 outputs a latch signal $\phi 2$ for causing the thermal head 10 to latch the energization data $\phi 1$ and a strobe signal $\phi 3$ for reproducing tones in dot units by controlling the number of energizations of the heating elements 11 according to the energization data $\phi 1$. An example of an image generating apparatus (printer) 1 that outputs an image with 8 tones (m=8) is described below.

Figure 2:
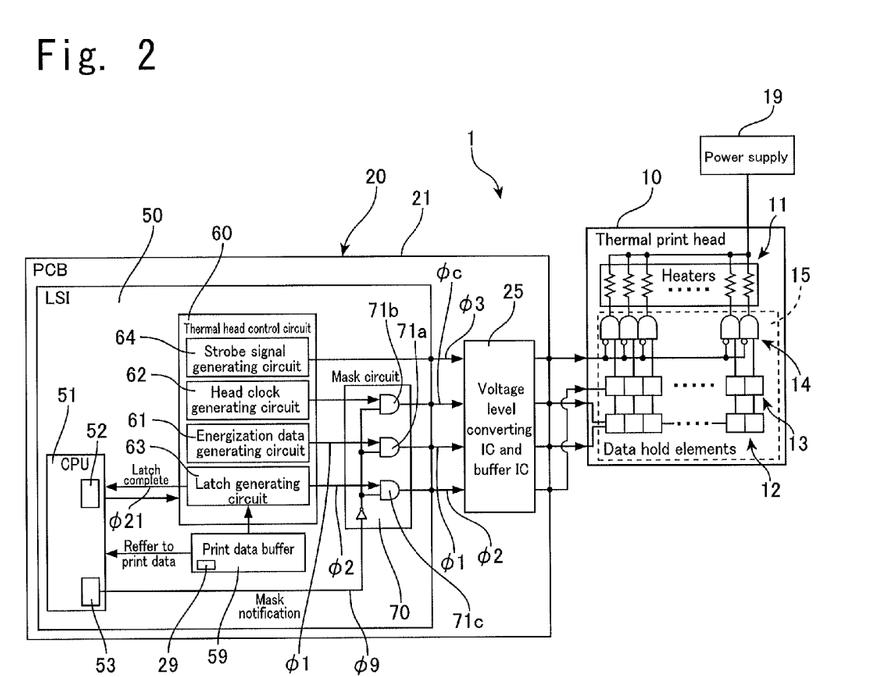
FIG. 2 is a block diagram showing an arrangement of a thermal head and a control unit.

FIG. 2 is a block diagram showing the overall construction of the thermal head 10 and the control unit 20. The thermal head 10 is a line thermal head and is capable of forming a plurality of dots that are aligned in the width direction (sub-scanning direction) of the paper 31 in line units (units in the main scanning direction). The thermal head 10 may also form the dots included in a plurality of lines simultaneously. That is, the thermal head 10 may form a plurality of dots that are aligned in the sub-scanning direction simultaneously as one line or in parallel. In the following description, an example where printing (the formation of dots) is carried out in single line units is described. Accordingly, the thermal head 10 includes a plurality (n) of heating elements 11 arranged in a line. Each heating element 11 is individually supplied with power from a power supply 19.

The thermal head 10 includes a driving circuit 15 that carries out on/off control of the heating elements 11. The driving unit 15 includes a plurality (n) of shift registers (data hold elements) 12 for receiving binary dot control data (hereinafter referred to as "energization data"), a plurality (n) of latch circuits 13, and a plurality (n) of gate circuits 14. The shift registers (data hold elements) 12 are circuits that receive the energization data $\phi 1$ supplied together with a head clock signal $\phi c$ from the control unit 20 and carry out serial-parallel conversion. The latch circuits 13 latch the energization data $\phi 1$ converted to parallel by the shift registers 12 according to the latch signal $\phi 2$ and paralleled data are corresponding to the heating elements 11. The gate circuits 14 are circuits that supply power to the individual heating elements 11 to cause the heating elements 11 to heat up according to the energization data $\phi 1$ latched by the individual latch circuits 13 and the strobe signal $\phi 3$ supplied in line units.

The thermal head control circuit 60 of the control unit 20 supplies the energization data $\phi 1$, the head clock signal $\phi c$, the latch signal $\phi 2$, and the strobe signal $\phi 3$ to the thermal head 10. Accordingly, the thermal head control circuit 60 includes functions as a signal supplying unit and a head clock generating unit.

First, the thermal head control circuit 60 that functions as a signal supplying unit includes an energization data generating unit (or "first unit" or "energization data generating circuit") 61 that generates and outputs the energization data $\phi 1$. The print data 29 of each line to be printed in the present embodiment is 3 bits×n (0~n−1) data to produce 8 tones numbered 0 to 7. Note that "n" represents an integer relating to the number of dots that construct one line. The energization data generating circuit 61 generates, from the eight-tone print data 29, the energization data $\phi 1$ including n on/off ("0,1") signals in line units seven times (i.e., in seven sets).

The thermal head control circuit 60 includes a head clock generating circuit (or "head clock generating unit") 62. The head clock generating circuit 62 generates the head clock signal $\phi c$ for outputting one set of the energization data $\phi 1$ and in concert with the energization data generating unit 61 outputs the energization data $\phi 1$ including n binary signals from the LSI 50. For example, by cyclically outputting the n head clock signals $\phi c$, it is possible to serially transfer one set (one line) of the energization data $\phi 1$ that includes n binary signals.

The thermal head control circuit 60 further includes a latch generating circuit (or "second unit") 63. When the energization data $\phi 1$ of one line has been outputted from the thermal head control circuit 60, the latch generating circuit 63 outputs a signal (latch signal) φ2 for latching the energization data φ1 from the thermal head control circuit 60.

The thermal head control circuit 60 further includes a strobe signal generating circuit 64. The strobe signal generating circuit 64 outputs the strobe signal φ3 from the thermal head control circuit 60 following the latch signal φ2. The strobe signal φ3 is a signal that controls the heating time of the heating elements 11 of the thermal head 10 and may be a signal with a fixed period. The strobe signal φ3 may alternatively be a signal with a variable period with consideration to the thermal history or the like. In the following description, a strobe signal φ3 with a fixed period is described as an example. Also, although the latch signal φ2 and the strobe signal φ3 are outputted as inverted signals in this example, such signals do not need to be inverted signals.

The CPU 51 of the control unit 20 includes a data output unit (data output function) 52 and an erase signal output unit (erase signal generating function) 53 outputting an erase signal φ9. On acquiring the latch end signal φ21 from the thermal head control circuit 60, the data output unit 52 causes the thermal head control circuit 60 to start generating and outputting the next energization data φ1. When the energization data (the current energization data) φ1 to be outputted next according to the multi-tone print data 29 is the same as the previous energization data (φ1, the erase signal output unit outputs the erase signal φ9 that masks and erases the current energization data φ1.

Accordingly, the erase signal output unit 53 may be a circuit that buffers the previous energization data (energization data of the previous cycle) φ1 outputted from the thermal head control circuit 60, carries out a comparison with the current energization data (energization data of the current cycle) φ1 using a comparator or the like, and determines whether the current energization data φ1 is necessary. With such a circuit, it is also possible to output the erase signal φ9. In this example, the erase signal φ9 is outputted using an inverted signal (negative logic), but does not need to be an inverted signal.

The control unit 20 includes the erase unit 70 that is operable when the current dot control data (energization data) φ1 is the same as the previous dot control data (energization data) to erase at least one of the current energization data φ1 and/or the latch signal φ2 to be supplied to the head unit 10. The erase unit 70 according to the present embodiment is a mask circuit, and such mask circuit 70 erases the energization data φ1, the head clock signal φc, and the latch signal φ2 outputted from the thermal head control circuit 60 using the erase signal φ9. The mask unit includes gate circuits (AND circuits) 71a, 71b, and 71c that respectively mask the energization data φ1, the head clock signal φc, and the latch signal φ2 using the erase signal φ9. In the control unit 20, the mask circuit 70 is incorporated in the LSI 50 and energization data φ1 that is the same as the previous data is not outputted from the LSI 50 and also not outputted from the printed circuit board (PCB) 21.

Figure 3:
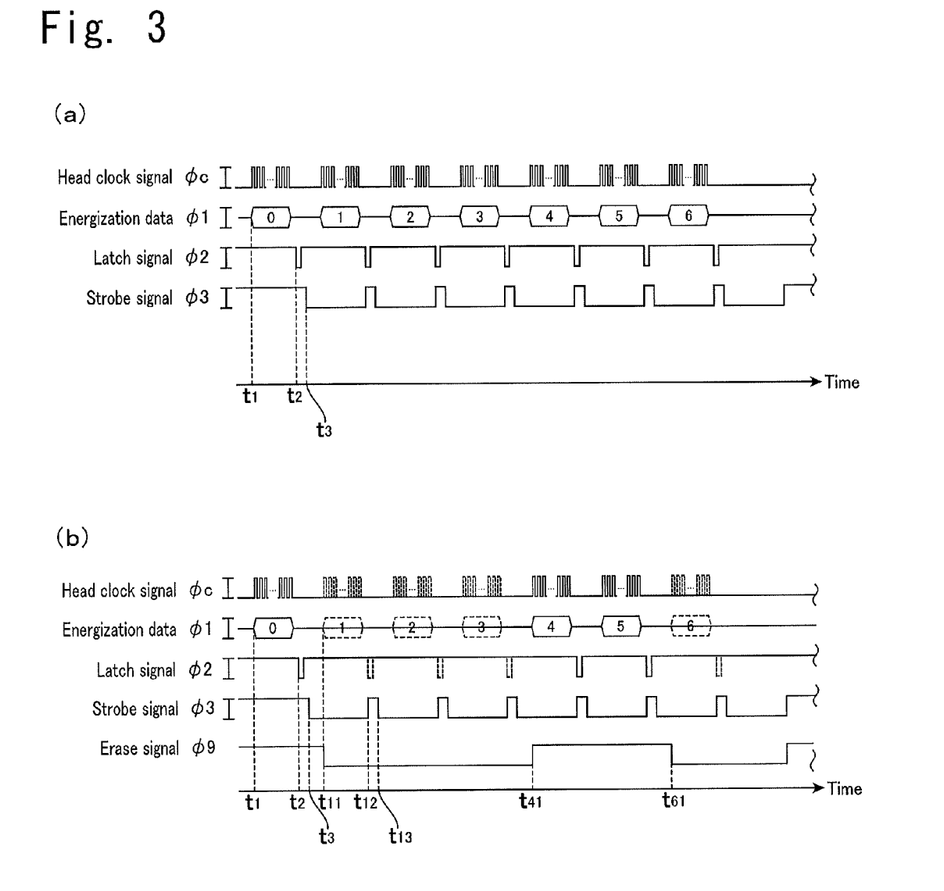
FIGS. 3(a) and 3(b) are timing charts explaining signals inputted into and outputted from the mask circuit of the control unit of the printer in FIG. 1.

FIGS. 3(a) and (b) show the energization data φ1, the head clock signal φc, the latch signal φ2, and the strobe signal φ3. The energization data φ1, the head clock signal φc, and the latch signal φ2 shown in FIG. 3(a) show a state where such signals are outputted from the thermal head control circuit 60, that is, a state where such signals are inputted into the mask circuit 70. That is, FIG. 3(a) shows the signals supplied from the control unit 20 to the thermal head 10 in an apparatus that does not have a mask circuit 70. The energization data φ1, the head clock signal φc, and the latch signal φ2 shown in FIG. 3(b) show a state where such signals are outputted from the mask circuit 70.

As shown in FIG. 3(a), the zeroth energization data φ1 that outputs the first tone, the first energization data φ1 that depicts the second tone, the second energization data φ1 that depicts the third tone, the third energization data φ1 that depicts the fourth tone, the fourth energization data φ1 that depicts the fifth tone, the fifth energization data φ1 that depicts the sixth tone, and the sixth energization data φ1 that depicts the seventh tone are generated in order and outputted from the thermal head control circuit 60. The zeroth energization data φ1 depicts the zeroth and first tones out of the tones numbered zero to seven.

In FIG. 3(a), from the thermal head control circuit 60, the zeroth energization data φ1 is outputted together with the head clock φc at time t1, a signal φ2 for latching the zeroth energization data φ1 is outputted at time t2, and the strobe signal φ3 is outputted at time t3. The same signals are repeatedly outputted for the first to sixth energization data φ1. In this way, the energization data φ1 for forming one line is divided into the zeroth to sixth energization data φ1 and is outputted divided into seven times (seven cycles).

The zeroth to sixth energization data φ1 respectively differ when the print data 29 of the line to be printed includes dots showing all of the tones out of the tones numbered zero to seven. On the other hand, when the print data 29 of the line to be printed does not include one of the tones, there is the possibility that energization data φ1 that is the same will be generated. For example, if the tones present on a given line are 0, 4, 5, and 7 or only 4, 5, and 7, the zeroth to third energization data φ1 will be the same. The fifth and sixth energization data φ1 will also be the same. Accordingly, the energization data φ1 outputted the first, second, third, and fourth times (i.e., in the first, second, third, and fourth cycles) will be the same and the energization data φ1 outputted the sixth and seventh times (i.e., in the sixth and seventh cycles) will be the same.

For this reason, as shown in FIG. 3(b), the erase signal output unit 53 inverts the erase signal φ9 at time t11 when the second-cycle energization data φ1 (i.e., the first energization data φ1) is outputted so that the first energization data φ1 is masked and erased by the mask circuit (erase unit) 70. In the same way, while the third-cycle (i.e., second) and the fourth-cycle (i.e., third) energization data φ1 that are the same as the first-cycle (i.e., zeroth) energization data φ1 are being outputted, the erase signal output unit 53 inverts the erase signal φ9 to erase the first to third energization data φ1 using the mask circuit 70. In addition, in the mask circuit 70, the head clock signal φc for transferring the second to fourth-cycle (i.e., the first to third) energization data φ1 and the signal φ2 for latching the second to fourth-cycle (i.e., the first to third) energization data φ1 are masked and erased according to the inverted erase signal φ9. In FIG. 3(b), the erased signals are shown by broken lines.

After this, the erase signal output unit 53 clears the erase signal φ9 before the time t41. By doing so, the mask circuit 70 allows the fifth-cycle (i.e., fourth) and sixth-cycle (i.e., fifth) energization data φ1 that are not the same as the previous energization data φ1, the head clock signal φc for transferring the fourth and fifth energization data φ1, and the signal φ2 for latching the fourth and the fifth energization data φ1 to pass without erasing.

The erase signal output unit 53 inverts the erase signal φ9 at time t61 when the seventh-cycle (i.e., sixth) energization data φ1 that is the same as the sixth-cycle (i.e., fifth) energization data φ1 is to be outputted. By doing so, the mask circuit (erase unit) 70 masks and erases the seventh-cycle (i.e., sixth) energization data φ1, the head clock signal φc for transferring the sixth energization data φ1, and the signal φ2 for latching the sixth energization data φ1.

Figure 4:
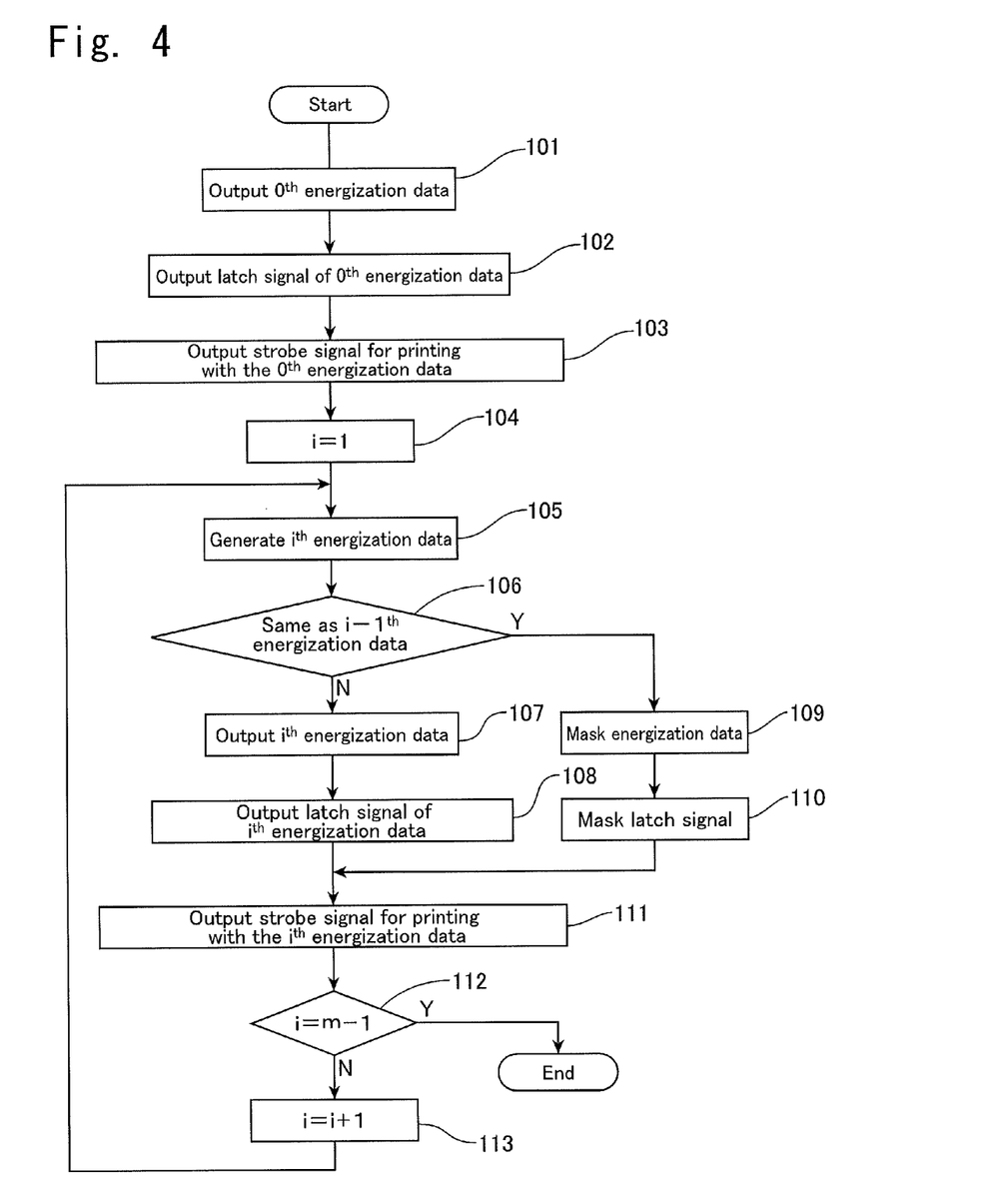
FIG. 4 is a flowchart showing the control method of the printer in FIG. 1.

FIG. 4 shows, by way of a flowchart, a process (control method) for reproducing multiple tones out of the control of the printer 1 by the control unit 20. In step 101 to step 103, processing of the zeroth (i=0) density out of the eight tones (m=8, i=0 to 7) is carried out. Dots with the zeroth density, that is, dots that are white or off are expressed as "0" in the first energization data φ1 and dots of other densities (tones) are expressed as "1". In step 101, the zeroth energization data φ1 is outputted at time t1 from the control unit 20. When the outputting of the energization data φ1 has ended, in step 102 the latch signal φ2 is outputted at time t1 from the control unit 20. After this, in step 103, the strobe signal φ3 is outputted from the control unit 20 and dots with the first tone are printed on the recording medium 31 by the thermal head 10.

Next, the processing from the first (i=1) density onwards is carried out in order. In step 104, "i" is set at "1". In step 105, the energization data generating unit 61 generates the energization data φ1 for the second tone. Dots with the zeroth and first densities are expressed as "0" and dots of other densities (tones) are expressed as "1". Accordingly, when there are no dots of the first density, the zeroth energization data φ1 and the first energization data φ1 are the same.

With this control method, in step 106, when the previous energization data φ1 and the current energization data φ1 are the same, in step 109 the erase signal output unit 53 outputs the erase signal φ9 so that the current energization data φ1 and the head clock signal φc are masked by the mask circuit 70. In addition, the latch signal φ2 is masked by the mask circuit 70 in step 110. Accordingly, when there are no dots of the first density, the first energization data φ1 is masked together with the head clock signal φc, the latch signal φ2 is also masked, and such data and signals are not outputted from the control unit 20.

On the other hand, when, in step 106, the previous energization data φ1 and the current energization data φ1 are different, the erase signal output unit 53 does not output the erase signal φ9, the current energization data φ1 and the head clock signal φc are outputted from the control unit 20 in step 107, and the latch signal φ2 is also outputted in step 108.

After this, in step 111, the first strobe signal φ3 is outputted regardless of whether or not the energization data φ1 has been supplied to the thermal head 10. As a result, even if the first energization data φ1 and the latch signal φ2 are not supplied to the thermal head 10, at the thermal head 10, the dots of the second tone will still be printed on the recording medium 31 using the zeroth energization data φ1.

The condition of the parameter "i" is determined in steps 112 and 113 and the processing in steps 105 to 111 is repeated. In the example shown in FIG. 3(b), following the first data, the second and third energization data φ1 are masked, and at the thermal head 10, the dots of the third and fourth tones are printed on the recording medium 31 using the zeroth energization data φ1. The fourth and fifth energization data φ1 are not masked and at the thermal head 10, the dots of the fifth tone are printed on the recording medium 31 using the fourth energization data φ1 and the dots of the sixth tone are printed on the recording medium 31 using the fifth energization data φ1. The sixth energization data φ1 is masked, and at the thermal head 10, the dots of the seventh tone are printed on the recording medium 31 using the fifth energization data φ1.

In this way, when conventionally reproducing multiple tones using a line thermal head, data was transferred a number of times equal to the number of tones minus one. However, not all of the tones are present on all of the lines. This means there will be cases where data is transferred even though it is not actually necessary to update the data. With the control unit 20 according to the present embodiment, unnecessary data transfer is not carried out, that is, by masking the clock signal φc, the energization data φ1 that is dot control data, and the latch signal φ2, the number of switchings of the clock signal φc, the energization data φ1, and the latch signal φ2 is reduced, so that the power consumption of the LSI 50, the thermal head 10, the voltage level converting IC 25 interposed between the LSI 50 and the thermal head 10, and other buffer ICs and the like can be reduced.

Note that with the control unit 20 described above, when it is not necessary to send the energization data φ1, all of the head clock signal φc, the energization data φ1, and the latch signal φ2 are masked by the mask circuit 70 to stop the transferring of data. A reduced power consumption effect can be obtained for any of the LSI 50, the thermal head 10, and the voltage level converting IC 25 interposed between the LSI 50 and the thermal head 10 by stopping the transferring of any of the head clock signal φc, the energization data φ1, and the latch signal φ2. For example, it is possible to stop the transferring of the energization data φ1 by merely stopping the transferring of the head clock signal φc, which makes it possible to reduce the power consumed in the LSI 50, the thermal head 10, and the voltage level converting IC 25. By stopping the transferring of the latch signal φ2, it is possible to reduce the power consumed by a latch operation at the thermal head 10.

Figure 5:
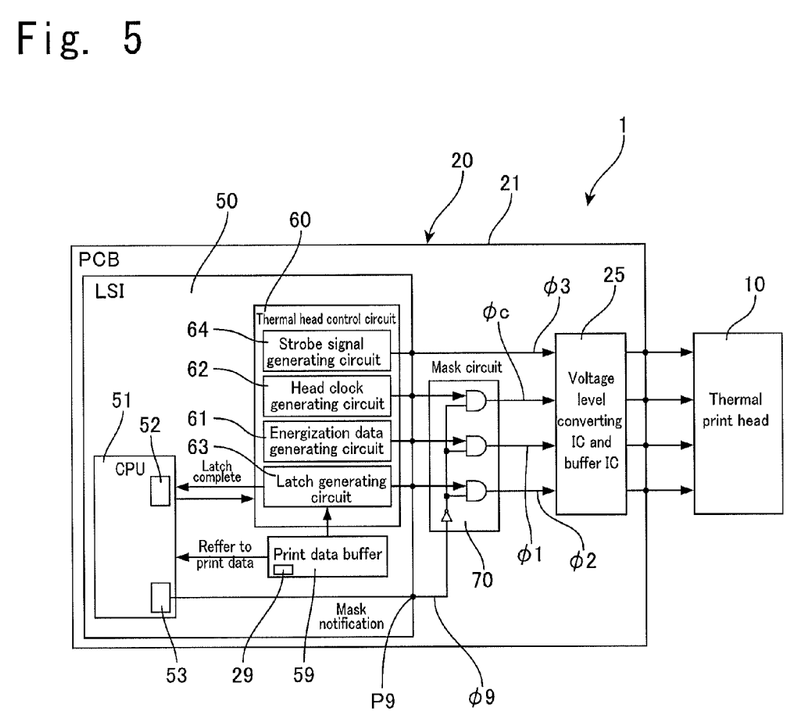
FIG. 5 is a block diagram showing another example of a control unit.

FIG. 5 is a block diagram of a printer 1 including a control unit 20 of a different configuration. In this example, the mask circuit 70 that is the erase unit is arranged separately to the LSI 50 and is mounted on the printed circuit board 21 that forms the control unit 20. Accordingly, the LSI 50 includes a terminal P9 for outputting the erase signal φ9.

Figure 6:
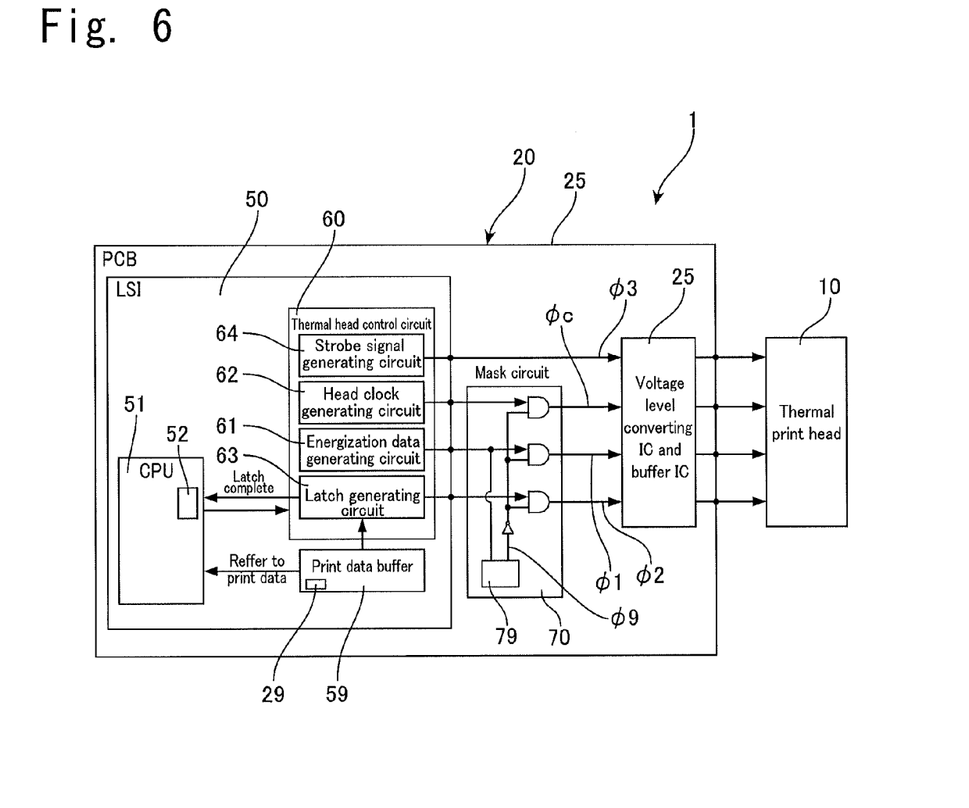
FIG. 6 is a block diagram showing yet another example of a control unit.

FIG. 6 is a block diagram of a printer 1 that includes a control unit 20 of yet another configuration. In this example, the mask circuit 70 that is the erase unit is arranged separately to the LSI 50 and is mounted on the printed circuit board 21 that forms the control unit 20. In addition, the mask circuit 70 includes a circuit 79 that compares the previous energization data φ1 and the current energization data φ1 and generates the erase signal φ9 inside the mask circuit 70. Accordingly, the LSI 50 does not need to include a function that generates the erase signal φ9. The comparison circuit 79 can also be incorporated in the thermal head control circuit 60 of the LSI 50.

Figure 7:
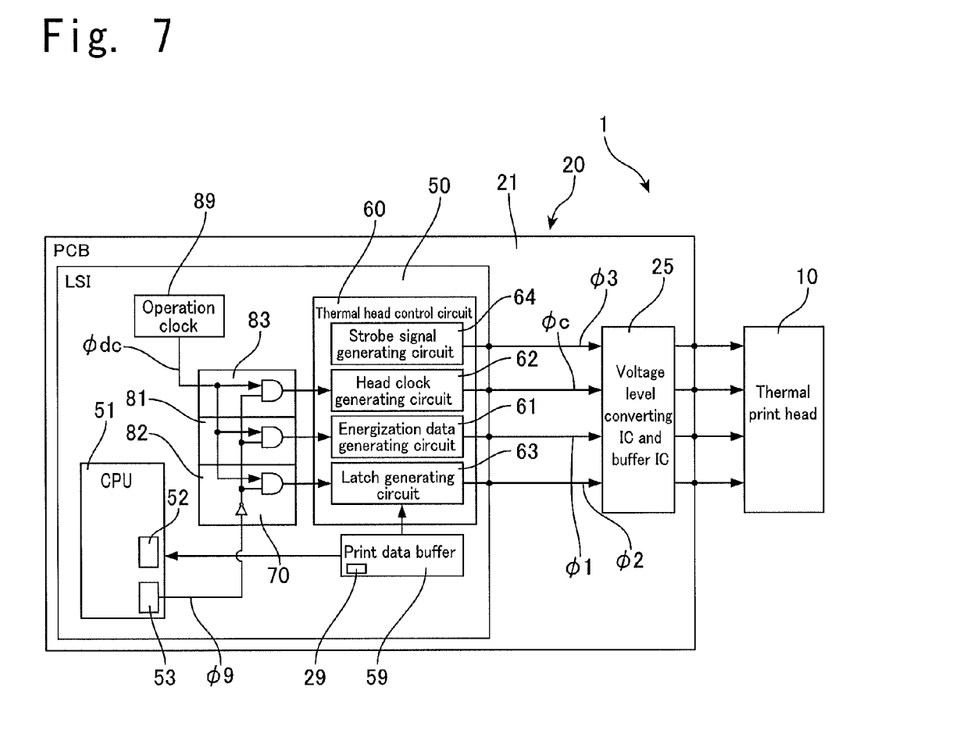
FIG. 7 is a block diagram showing yet another example of a control unit.

FIG. 7 is a block diagram of a printer 1 including a control unit 20 of yet another configuration. In this example, the LSI 50 includes a first clock supplying unit 81 supplying an operation clock φdc from an operation clock source 89 to the energization data generating unit 61 for generating the energization data φ1 that is the dot control data, a second clock supplying unit 82 supplying the operation clock φdc from the operation clock source 89 to the latch generating circuit 63 that generates the latch signal, and a third clock supplying unit 83 that supplies the operation clock φdc from the operation clock source 89 to the head clock generating unit 62 that generates the head clock signal φc. Also, the respective clock supplying units 81 to 83 include a gate circuit that stops the supplying of the operation clock φdc according to the erase signal φ9 supplied from the CPU 51. Accordingly, in this example, the clock supplying units 81 to 83 function as the erase unit 70 and turn the supplying of the operation clock φdc to the energization data generating unit 61, the latch generating circuit 63, and the head clock generating unit 62 on and off according to the erase signal φ9. As a result, the energization data φ1, the latch signal φ2, and the head clock signal φc are erased by the erase unit 70. Note that it is possible to turn the supplying of the operation clock φdc to the energization data generating unit 61, the latch generating circuit 63, and the head clock generating unit 62 on and off according to the erase signal φ9 and to erase any of the energization data φ1, the latch signal φ2, and the head clock signal φc.

When a mask circuit is used as the erase unit 70, it is preferable for the energization data φ1 and the like to be masked at the closest possible position to the LSI 50 that is the output source of the energization data φ1 and the like. It is possible to reduce the power consumption of the voltage level converting IC 25 and the thermal head 10 that are downstream of the mask circuit. By using the erase unit 70 that turns the operation clock φdc supplied to the energization data generating unit 61, the latch generating circuit 63, and the head clock generating unit 62 on and off according to the erase signal φ9, it is possible to reduce the power consumed by the energization data generating unit 61, the latch generating circuit 63 and the head clock generating unit 62 and achieve an even greater reduction in power consumption.

Note that although a sublimation-type line thermal printer that uses a sublimation ribbon has been described in the present embodiment, the present invention can be applied in the same way to a line thermal printer that prints using thermal paper as a medium with predetermined color-forming characteristics with respect to heat or to another type of image generating apparatus that prints multiple tones. An image generating apparatus to which the present invention can be applied is not limited to a line-type printer and may be a serial-type printer where a head moves reciprocally in the scanning direction. The image generating apparatus is also not limited to a personal printer and may be a multifunctional device or a commercial printer.

The invention claimed is:

1. A control apparatus that reproduces multiple tones by outputting dot control data in multiple cycles in line units to a head unit including a plurality of dot generating elements disposed in a line, comprising:
a signal supplying unit supplying dot control data of each cycle and a signal for latching the dot control data of each cycle to the head unit; and
an erase unit operable when dot control data of current cycle is same as dot control data of previous cycle, to erase at least one of the dot control data of current cycle and the signal for latching the dot control data of current cycle to be supplied from the signal supplying unit to the head unit.

2. The control apparatus according to claim 1, wherein the erase unit includes a mask unit erasing at least one of the dot control data and the signal for latching on a path from the signal supplying unit to the head unit.

3. The control apparatus according to claim 1, wherein the erase unit includes a clock erase unit erasing a head clock signal used to transfer the dot control data of each cycle.

4. The control apparatus according to claim 3, wherein the clock erase unit includes a clock mask unit erasing the head clock signal on a path from the signal supplying unit to the head unit.

5. The control apparatus according to claim 1, wherein the signal supplying unit includes a first unit generating the dot control data of each cycle and a second unit generating the signal for latching, and the erase unit includes a clock control unit stopping supplying of an operation clock to at least one of the first unit and the second unit.

6. The control apparatus according to claim 5, further comprising a head clock generating unit generating a head clock used to transfer the dot control data of each cycle,
wherein the erase unit includes a clock control unit stopping supplying of the operation clock to the head clock generating unit.

7. An image generating apparatus comprising:
a control apparatus according to claim 1; and
a head unit.

8. The image generating apparatus according to claim 7:
wherein the plurality of dot generating elements are a plurality of heating elements.

9. A control method of an image generating apparatus including a control apparatus supplying dot control data to a head unit including a plurality of dot generating elements disposed in a line,
wherein the control method includes reproducing multiple tones by outputting dot control data in multiple cycles in line units from the control apparatus,
and the reproducing multiple tones comprises:
supplying the dot control data of each cycle and a signal for latching the dot control data of each cycle to the head unit; and
erasing, when dot control data of the current cycle is same as dot control data of previous cycle, at least one of the dot control data of current cycle and the signal for latching the dot control data of current cycle to be supplied to the head unit.

10. The control method according to claim 9,
wherein the control apparatus further includes a head clock generating unit generating a head clock signal used to transfer the dot control data, and
the reproducing multiple tones further comprises erasing the head clock signal when the dot control data of current cycle and the dot control data of previous cycle are the same.

* * * * *